Figure 1:
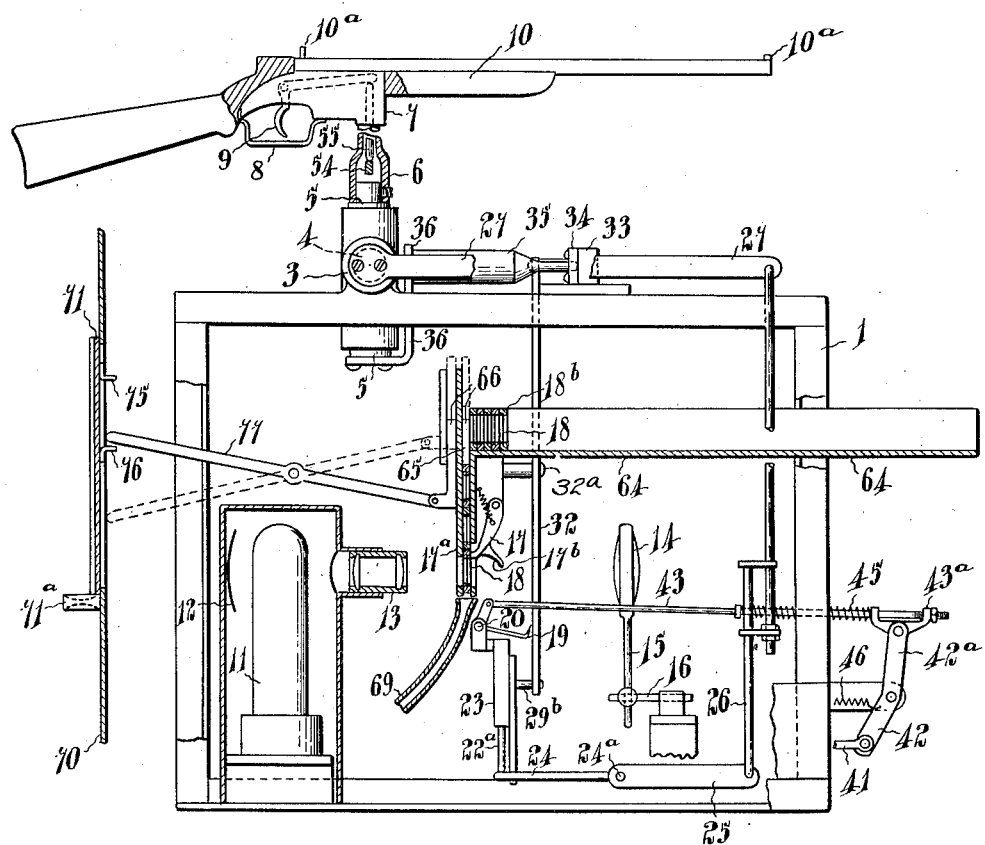

Sept. 30, 1930. J. W. MILLER 1,776,816
MARKSMANSHIP INDICATING APPARATUS
Filed July 8, 1929  3 Sheets-Sheet 1

Inventor
J. W. Miller
by J. Edw Maybee
ATTY.

Sept. 30, 1930.  J. W. MILLER  1,776,816
MARKSMANSHIP INDICATING APPARATUS
Filed July 8, 1929  3 Sheets-Sheet 2
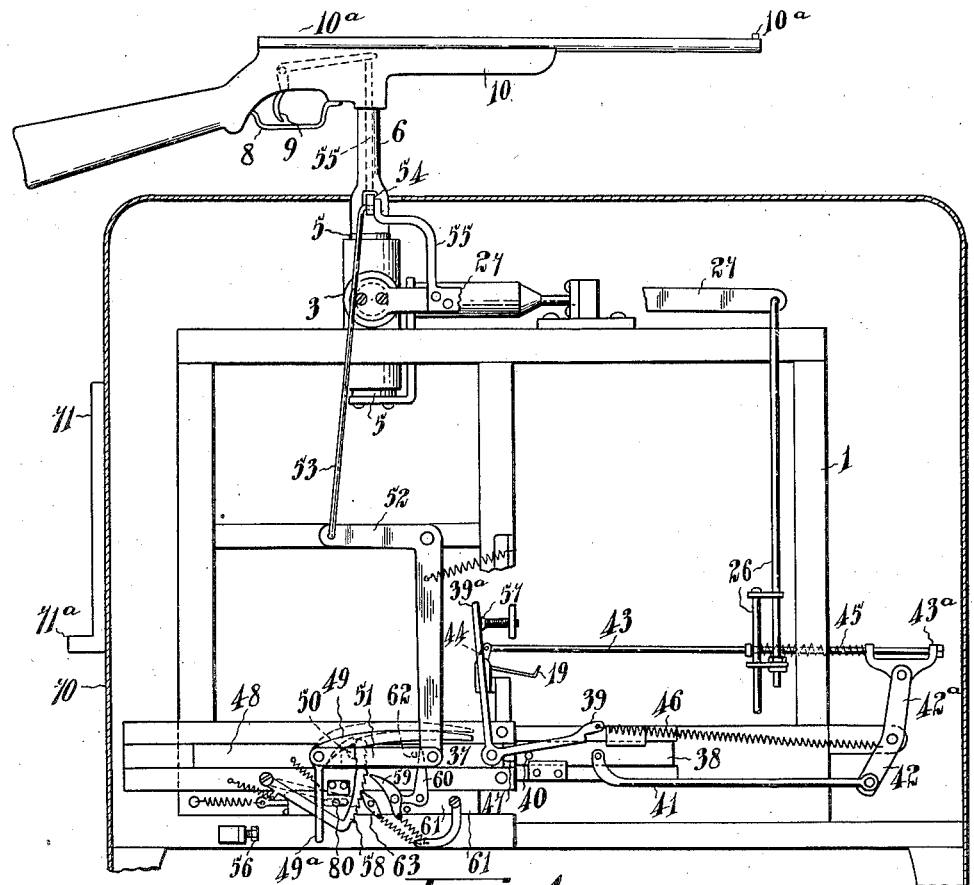
Fig. 4.
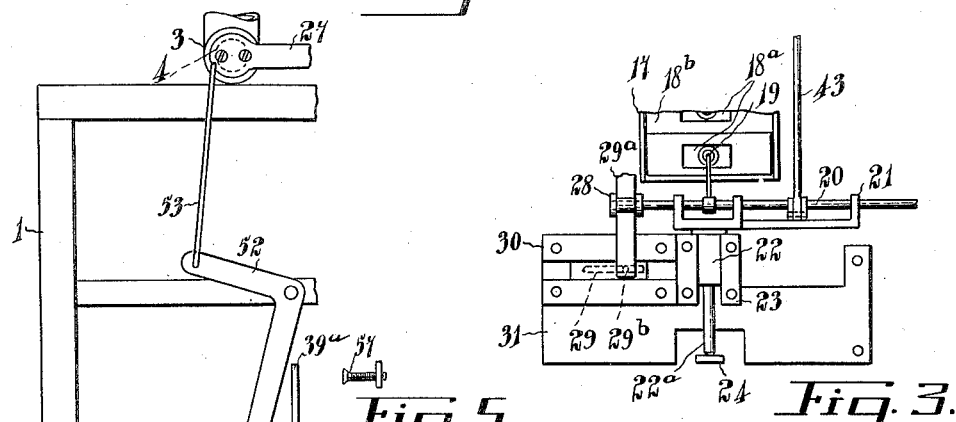
Fig. 5.  Fig. 3.
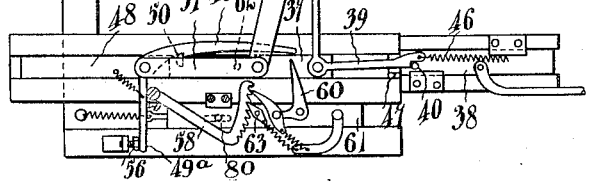
Inventor
J. W. Miller
by J. Edw. Maybee
ATTY Sept. 30, 1930.  J. W. MILLER  1,776,816
MARKSMANSHIP INDICATING APPARATUS
Filed July 8, 1929   3 Sheets-Sheet 3

Inventor
J. W. Miller
by J. Edw Maybee
ATTY

Patented Sept. 30, 1930

1,776,816

UNITED STATES PATENT OFFICE

JOHN W. MILLER, OF TORONTO, ONTARIO, CANADA, ASSIGNOR TO HARRY CLAVIR, OF TORONTO, ONTARIO, CANADA

MARKSMANSHIP-INDICATING APPARATUS

Application filed July 8, 1929. Serial No. 376,814.

This invention relates to marksmanship indicating apparatus, and more particularly to the sub-target type of apparatus in which an image of a miniature target is optically projected on to a wall or screen in front of the apparatus so that the aiming element may be aimed at the projected image and the result of each shot will be recorded on the miniature target and shown on the projected image. The object of this invention is to provide mechanically operated apparatus for accomplishing these results.

A further object is to so construct the apparatus that it will be conditioned for operation upon the insertion of a coin or token, and will automatically be thrown out of action when a predetermined number of "shots" have been "fired". Further objects I have in mind will hereinafter appear.

I attain my objects by means of the constructions briefly described as follows. The target is displayed by optically projecting a target image from a transparency, formed on a film or the like such as employed for photographic purposes, on to a screen in front of the aiming element which is mounted on a swivel means, such as a needle, for marking the film is normally positioned out of the path of the projection of the image and is adapted to be moved both vertically and horizontally relative to the film, so that it will mark or penetrate the latter at a point corresponding to a point on the projected image in line with the aiming element, whereby the results of each shot will be projected on to the screen. The film marking means is actuated to mark the film by a manually operable member and a bolt having a latch connection with the member and having a pawl connection with a slide. The latter is connected by linkage including a pivoted arm with the film marking means, and the arm and pawl are connected with opposite ends of a spring which tends to move the bolt to actuate the film marking means, and tends to return the latter to its normal position. By moving the member and thus the bolt, to increase the tension of the spring and to engage the pawl with the slide and then tripping the latch. the slide is moved to actuate the film marking means. The latter is returned immediately to its normal position by tripping the pawl to disengage it from the slide. The latch is adapted to be thrown out of operation when the bolt has been operated a predetermined number of times.

The films are carried in a magazine so that they may be fed one at a time to a clamp which positions them in front of the lamp of the projection device. A manually operable plunger having a limited movement at all times, and a more extended movement when a coin is inserted therein is adapted during the said extended movement to feed a film to the clamp, to close a switch for supplying energy to the lamp, and to reset the latch to its operative position. After the marksman has "fired" the predetermined number of "shots" he may obtain his film by moving the plunger a limited distance to release the clamp. This limited movement of the plunger also opens the lamp switch.

Figure 2:
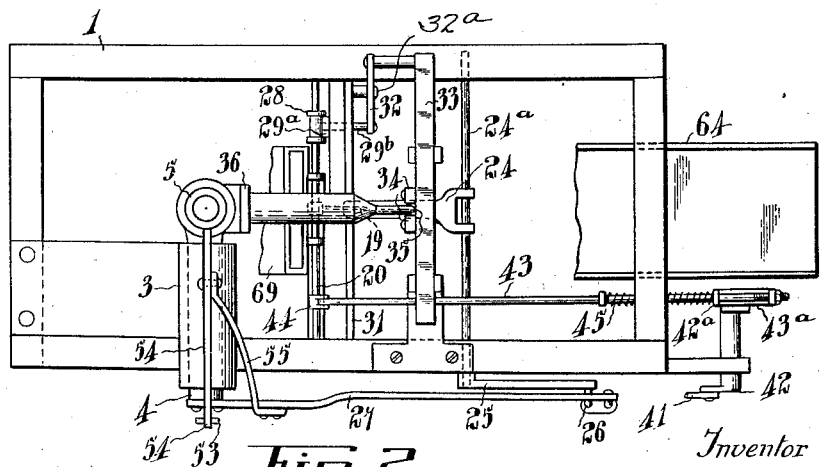
Figure 6:
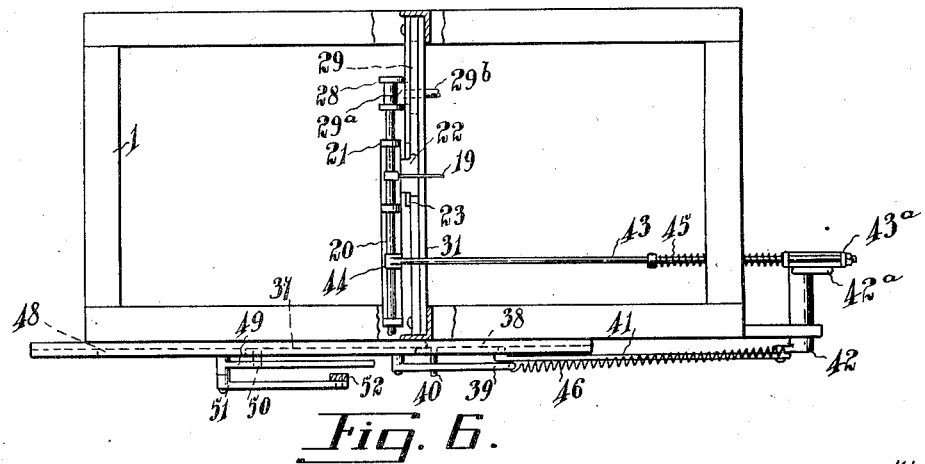
Figures 7, 8, 9:
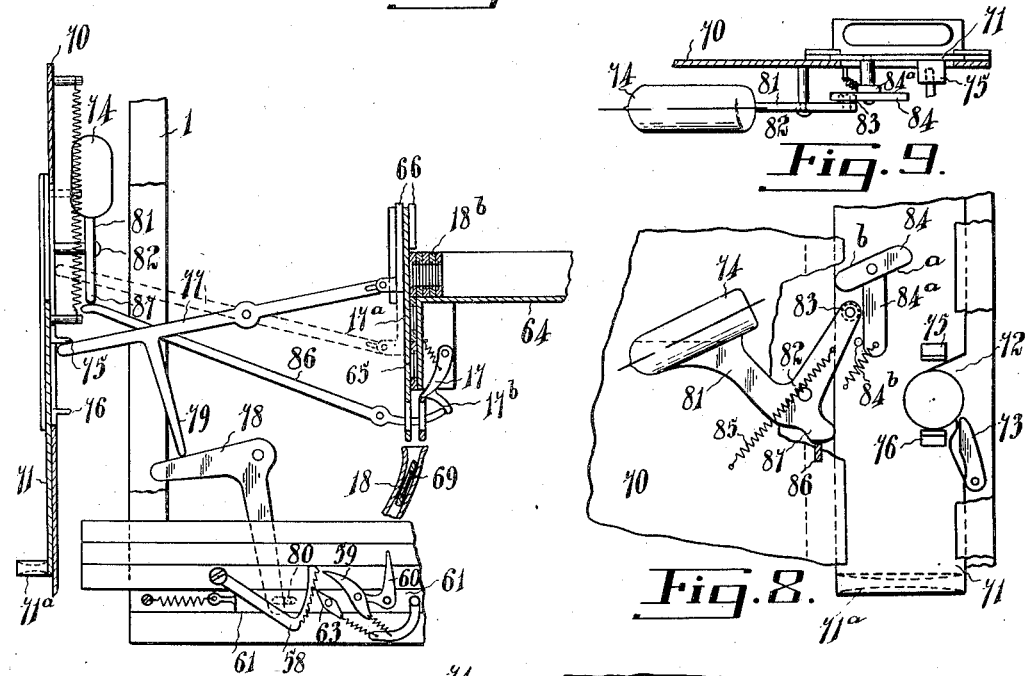

The constructions are hereinafter more fully described, and are illustrated in the accompanying drawings, in which Fig. 1 is a side elevation, partly in section, on my apparatus;

Fig. 2 a plan view, partly broken away, of the parts shown in Fig. 1;

Fig. 3 a rear elevation of the film marking means;

Fig. 4 a side elevation of the means for actuating the film marking means;

Fig. 5 a view similar to Fig. 4, showing the position of the actuating means just before it is tripped;

Fig. 6 a plan view of certain of the parts shown in Fig. 4;

Fig. 7 a diagrammatic view showing the connections between the coin receiving plunger, the means for feeding a fresh film and the resetting means, and the means carried by the plunger for operating the lamp switch and the clamp;

Fig. 8 a rear view of the plunger showing the lamp switch and clamp controlling mechanism with the switch on and the clamp closed at the end of the predetermined member of slots, and showing a fresh coin inserted for conditioning the machine for operation again;

Fig. 9 a plan view, partly in section of the parts in Fig. 8; and

Figure 10:
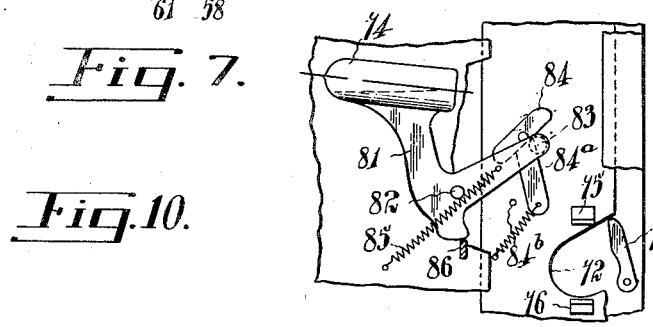

Fig. 10 a view similar to Fig. 8, showing the operation of the plunger without inserting a coin to release the film and to open the switch.

1 is a frame preferably formed of angle iron, on which a bearing 3, having its axis horizontal, is supported, see Figs. 1 and 2. A T shaped journal 4 having the stem part thereof journalled in the bearing 3 has its head or end spaced from the bearing. A pin 5 is journalled in the said head or end, the axis of the pin 5 thus being at right angles to the axis of the journal 4. To the pin 5 is secured an upwardly extending tube 6 to which is secured a housing 7 and guard 8 for the trigger 9. The housing is adapted to be received in a correspondingly shaped recess formed in an aiming element 10 and these parts are suitably secured together, whereby the aiming element will swing in a vertical plane on the journal 4, and in a horizontal plane on the pin 5.

Suitably mounted within the frame 1 is a picture projection device of any well known type and which includes a lamp 11, a reflector 12, a condenser 13, and a focusing lens 14, which lens is carried on a vertically adjustable rod 15 which in turn is horizontally adjustable on the rod 16. Between the condenser 13 and lens 14 is carried a clamp 17 adapted to position a film 18, having an image 18ª thereon (see Fig. 3) for projection on to a screen or wall (not shown) in front of the aiming element 10. As the film is very small and thin it is preferably mounted in a frame 18ᵇ formed of card-board.

Means for marking the film, such as a needle 19, see Figs. 1, 2 and 3, is so carried that it may be adjusted vertically and horizontally relative to the film to correspond to similar movements of the aiming element 10 relative to the projection on the screen. The needle 19 is secured to a rod 20, which is journalled and axially movable in lugs formed on a lateral extension 21 of a slide 22. This slide is vertically movable in a stationary guide 23 and has a pin 22ª projecting from its lower end. The pin rests on an arm 24 secured to a transverse shaft 24ª which has a second arm 25 secured thereto. The arm 25 is connected by a link 26 with an arm 27 which is secured to the end of the journal 4 that is remote from the pin 5. To the rod 20 is secured a flanged roller 28 adapted to receive a vertical extension 29ª of a slide 29 mounted to move horizontally in a guide 30. The guides 23 and 30 include a plate 31 extending transversely of the frame and the plate is slotted for the passage of a pin 29ᵇ secured to the slide 29. A lever 32 pivoted at 32ª has a slot engagement with the pin 29ᵇ and also a pin and slot engagement with a slide bar 33 which is provided with a pair of shoulders 34 for engagement with opposite sides of a finger 35. This finger is secured to the vertical portion of an L-shaped support 36, the horizontal portion of which is secured to the lower end of the pin 5. The film is carried in the clamp with its image upside down, therefore the construction must be such that a downward movement of the barrel of the aiming element 10 will result in the rod 20 and thus the needle 19 being moved upwardly and a horizontal movement of the element to the right or left will result in the rod and needle being shifted to the left or right respectively. Any suitable stops may be provided to limit the vertical and horizontal movements of the aiming element.

A spring actuated bolt 37 (see Figs. 4, 5 and 6) is adapted, when tripped, to actuate linkage including a suitably guided slide 38 to cause the needle 19 to mark or penetrate the film 18 at a point thereon corresponding to a point on the projected image in line with the sights 10ª of the aiming element at the time the bolt is tripped. On the bolt 37 is pivoted a pawl 39 which is adapted to engage a pin 40 on the slide 38 which is connected by a connecting rod 41 with an arm 42 of a bell crank. The other arm 42ª of this bell crank is offset relative to the arm 42 and has a fork 43ª pivoted thereon. A rod 43 carried by the fork is pivoted on an arm 44 secured to the needle rod 20. Preferably the rod 43 is loosely carried by the fork and has a spring 45 disposed thereon, one end of the spring engaging the fork and the other end a collar on the rod.

The needle 19 is normally positioned out of the path of the film projection by means of a spring 46, having one end connected with the pawl 39 and the other end connected with the arm 42 close to its fulcrum. This position of the needle is determined by the engagement of the slide 38 with any suitable stop 47 such as the guide for the bolt 37. It will be noted that the connection of the spring 46 with the bell crank 42 is so located relative to the pin 40 that the spring also tends to snap the pawl 39 into engagement with its pin 40 when the bolt 37 has been moved to permit the pawl 39 to engage the pin 40, and that the spring tends to move the bolt towards its stop 47 (see Fig. 5).

The bolt 37 is moved to increase the tension of the spring 46 by a reciprocable member 48 which is operable by the trigger 9 and carries a spring actuated latch 49 adapted to engage a keeper 50 secured to or formed on the bolt. The connections between the member 48 and the trigger comprise a link 51 connecting the member 48 with a bellcrank 52 which is connected by a link 53 with a lever 54 pivoted on a bracket 55 carried by the arm 27. One end of the lever 54 extends through a slot in the tube 6 for engagement by a plunger 55 mounted therein and operable by the trigger 9 which is shaped to serve as a bell crank. These parts may be returned to their normal positions by means of a spring.

Normally the needle actuating parts are positioned as shown in Fig. 4 and when the trigger is pulled back the link 51 moves the reciprocable member 48, latch 49, keeper 50, bolt 37 and pawl 39 to permit the latter to engage the pin 40 on the slide 38 as shown in Fig. 5. Upon a slightly further movement of the trigger the trip arm 49ª of the latch 49 will engage a stop 56 to trip the latch and thus release the bolt 37 to permit the said bolt and also the slide 38 to come under the action of the spring 46. This movement of the slide will result in the film being penetrated by the needle. As the bolt nears its stop 47, a trip arm 39ª on the pawl 39 engages a stop 57 to disengage the pawl from its pin 40 on the slide 38 whereby the spring 46 will move the arm 42 to return the needle 19 and the slide 38 to their normal positions. From this description it is obvious that the needle is moved to mark the film and is returned to its normal position while the bolt is under the action of the spring 46 so that the return movement of the needle is a rapid continuation of the movement of the needle towards the film.

The mark on or the hole in the film produced by the marking means 19 will be projected on to the screen to show immediately the results of the "shot".

The latch 49 is thrown and held out of operative engagement with the keeper 50 when a predetermined number of "shots" have been "fired". This is accomplished by means of a rack 58 pivoted on a suitable stationary part and provided with ratchet teeth adapted to be picked by a pawl 59 pivoted on a bell crank 60. The latter is pivoted on a movable plate 61 and is adapted to be actuated to move the rack one tooth towards the latch 49 each time the film marking means is actuated. The bell crank may be actuated by a pin 62 carried by the bolt 37, and a dog 63, pivoted on the plate 61, is adapted to lock the rack from backward movement while the pawl is being returned for engagement with a fresh tooth. When the rack has been moved a predetermined number of times, it engages and moves the latch 49 so that any further movements of the trigger will merely cause the latch to slide along the top of the rack until the plate 61 is moved, as hereinafter described, to release the pawl and dog from the rack. The rack is provided with a spring to ensure its return to its initial position and the plate is spring actuated to tend to maintain the pawl 59 and dog 63 in operative engagement with the rack 58.

A supply of films is carried in a magazine 64 and any suitable means, such as a weight actuated follower (not shown), tends to move the films towards a discharge slot 65, the rear wall of the slot being formed by the stationary part 17ª of the hereinbefore mentioned clamp 17. The wall 17ª also forms a guide on which a reciprocating feeder 66 is mounted to feed the films one by one towards the lower end of the clamp where they are frictionally held, by the spring actuated clamp part 17, to position them for projection by the hereinbefore described projection device. The movable clamp part 17 is adapted to be released to permit the marked film to drop into a chute 69 which leads to the exterior of the cabinet 70 to convey the film to the marksman.

A plunger 71 suitably guided on the cabinet for manual operation is provided with a recess or slot 72 adapted to receive a coin or token. A dog 73 is adapted to engage the wall of the recess 72 to limit the movement of the plunger when it is operated without the proper coin or token in the recess. A more extended movement of the plunger is obtained when a coin is inserted in the recess 72 to prevent the dog from engaging the wall thereof.

The said extended movement of the plunger 71, which is provided with a finger grip 71ª, may be limited in any suitable manner and during this movement the plunger actuates the reciprocating feeder 66 to feed a fresh film to the clamp 17, resets the latch 49 for operative engagement with the keeper 50 and closes a switch 74 for controlling electrical energy to the lamp 11 of the projection device. On the back of the plunger, see Fig. 7, are secured two spaced shoulders 75, 76 for engagement with one end of a lever 77, the other end of which has a pin and slot engagement with the feeder 66. The shoulders 75 and 76 are spaced apart a distance equal to the distance travelled by the plunger during its limited movement plus the width of the lever 77, to provide sufficient lost motion whereby the feeder 66 will not be moved during the limited movement of the plunger. When the lost motion has been taken up on the downward stroke of the plunger, the shoulder 75 engages the lever 77 to raise the feeder 66 for engagement with a fresh film 18 in the magazine 64. During this downward movement a bell crank 78 is rocked, by a projection 79 on the lever, to engage a pin 80 on the inner side of the movable plate 61. The plate is thus moved against the tension of its spring to disengage the pawl 59 and dog 63 from the rack 58 so that the spring of the latter will return it to its initial position which is determined by any suitable stop means.

When the shoulder 76 engages the lever 77 on the upward stroke of the plunger 71, it rocks the said lever to move the projection 79 away from the bell crank 78 to permit the plate 61 to return to its normal position with the dog and pawl positioned for moving the rack. This rocking movement of the lever 77 also lowers the feeder 66 to feed a fresh film to the clamp 17. Preferably the latter is positioned a distance equal to the width of three films below the magazine so that when a used film is released from the clamp there will be two films below the magazine in the discharge slot 65 and the feeding of the fresh film from the magazine will cause the said two films to be moved so that the lowermost one will be positioned for use in the clamp.

The switch 74 may be the well known mercury tube type in which the mercury conducts the current across the gap between two contacts when the tube is tilted in one direction (see Fig. 8). The switch is carried on one arm of a bell crank 81 pivoted at 82 on any suitable stationary part within the cabinet 70, the other arm of the bell crank having a laterally directed pin 83 adapted to be engaged by a cam 84 pivoted on the plunger 71 or on a part carried thereby. The cam is provided with an arm $84^a$ which is spring actuated to normally engage a stop $84^b$. Referring to Fig. 8, on the downward stroke of the plunger during its extended movement which is permitted by the insertion of a coin in the recess 72, the pin 83 is engaged by the underside $a$ of the cam 84, and slides along the underside $a$ until it passes the pivot of the cam (see Fig. 10) when it tilts the latter against the tension of its spring to permit the cam to pass beneath the pin. Any rocking movement of the bell crank during the downward movement of the plunger moves the switch 74 to its "off" position and a spring 85 is adapted to snap the switch from "on" to "off" and vice versa and to tend to retain it in either of these positions.

On the upward movement of the plunger 71, the pin 83 is engaged by the upper side $b$ of the cam 84 to rock the bell crank 81 sufficiently to move the connection of one end of the spring 85 and the bell crank past the centers of the pivot 82 and the connection of the other end of the spring whereby the spring will snap the switch 74 to its "on" position to light the lamp 11. During the continued upward movement of the plunger to its normal or initial position the pin 83 slides along the upper side $b$ until its passes the pivot of the cam when it tilts the latter against the tension of its spring to permit the cam to move past the pin and be positioned above the pin. The parts are now returned to their initial positions as shown in Fig. 8 and this it will be noted completes the cycle of movements of the cam. The latter is now positioned to engage the pin 83 to open the switch 74 on the next downward movement of the plunger 71.

The clamp 17 is opened to release the film therein by a lever 86 which engages an inclined face $17^b$ on the movable clamp part 17, and which is operable by an arm 87 on the bell crank 81. The arm and lever are adapted to open the clamp when the bell crank is moved to open the switch and are adapted to permit the clamp to close when the lamp is lit and before the feeder 66 feeds a fresh film to the clamp.

To permit the marksman to obtain his film from the clamp without inserting a fresh coin or token in the recess 72, the hereinbefore mentioned limited movement of the plunger 71 will move the cam 84 a sufficient distance to actuate the bell crank and lever 86 to open the clamp. This movement of the plunger will also open the switch 74, but the movement is not sufficient to enable the pin 83 to pass beneath the cam 84 nor to actuate the lever 77 to move the feeder 66 (see Fig. 10).

Assuming the latch 49 to be in its inoperative position, the clamp 17 and switch 74 open, the mode of operation is as follows: The marksman inserts a coin in the recess 72 and uses the finger grip $71^a$ to depress the plunger 71 to the end of its extended stroke. During this movement the pin 83 rocks the cam 84 to permit the latter to pass beneath the pin so that the spring will return the cam to its normal position with the arm $84^a$ against the stop $84^b$. The shoulder 75 on the plunger is also moved to rock the lever 77 to raise the feeder 66 and to reset the latch 49 and rack 58. The coin is ejected by any suitable means from the recess when the plunger reaches the end of its downward stroke. On the upward stroke of the plunger, which movement will be assisted by a spring tending to maintain the plunger in its raised position, the upper side $b$ of the cam 84 engages the pin 83 to actuate the bell crank 81 to close the switch 74 and to permit the spring actuated clamp part 17 to close the clamp. Towards the end of the upward stroke of the plunger, the feeder 66 reaches the end of its downward stroke to position a fresh film frame $18^b$ in the clamp.

The apparatus is now ready for use and the image on the film is projected on to the screen in front of the aiming element. As the marksman shifts the aiming element to aline the sights thereof with the bull's-eye or the part of the projection he desires to "hit", the needle 19 is correspondingly shifted relative to the film 18. When the trigger 9 is pulled the reciprocable member 48 operates the latch 49 to draw the bolt 37 and the pawl 39 against the tension of the spring 46 until the pawl engages the pin on the slide 38 and the latch 49 is tripped by the stop 56. The spring then draws the pawl, bolt and slide to actuate the needle to mark or penetrate the film at a point thereon corresponding to the point on the projected image in line with the sights of the aiming element.

As the bolt nears the end of this return movement the pawl is tripped by the stop 57 to disengage the slide 38 to permit the spring 46 to return the needle to its normal position. The hole or mark on the film is now projected on to the screen to indicate the exact spot "hit". The spot of light, passing through the hole in the film after the needle has penetrated the latter, has an appearance on the screen very similar to that of a bullet hole in the screen. During the return movement of the bolt, the bell crank 60 is moved to cause the pawl 59 to pick one tooth of the rack 58 to move it towards the latch 49. The above-mentioned shooting operations are continued until a predetermined number of "shots" have been "fired", and the rack has been moved to retain the latch 49 out of engagement with its keeper 50 on the bolt 37.

If the marksman does not wish to shoot again, he merely depresses the plunger 71 until the dog 73 engages the wall of the coin recess 72 (see Fig. 10), and this movement actuates the cam 84 to rock the switch carrying bell crank 82 to permit the spring 85 to throw the switch to its off position and to move the lever 86 to open the clamp 17. The used film is thus released for the marksman's record of his shooting and the lamp 11 is switched off. Should the marksman desire to shoot again, one depression of the plunger 71 with a coin therein (as shown in Fig. 8), which will permit the hereinbefore described extended movement of the plunger, will release his previous film and also condition the apparatus for operation again.

What I claim as my invention is:

1. In apparatus of the class described, the combination of an aiming element mounted to swing in vertical and horizontal planes; a film provided with an image for projection on to a screen; a vertically movable slide; an axially movable rod journalled horizontally on the slide; means for marking a point on the film, the marking means being carried on the rod; means operable by the aiming element for moving the slide to position the marking means vertically relative to the image on the film to correspond to the vertical positioning of the aiming element relative to the projected image on the screen; means operable by the aiming element for moving the rod to position the marking means horizontally relative to the image on the film to correspond to the horizontal positioning of the aiming element relative to the projected image on the screen whereby the film will be marked at a point thereon corresponding to a point on the projected image in line with the aiming element; and means for actuating the marking means to mark the film.

2. In apparatus of the class described, the combination of an aiming element; a film provided with an image for projection on to a screen; means, positioned relative to the film by the aiming element, for marking the film at a point thereon corresponding to a point on the projected image in line with the aiming element; means including a spring actuated bolt for actuating the film marking means to mark the film; means including a latch for moving the bolt to tension the spring; and means for tripping the latch to release the bolt.

3. In apparatus of the class described, the combination of an aiming element including a trigger; a film provided with an image for projection on to a screen; means, positioned relative to the film by the aiming element, for marking the film at a point thereon corresponding to a point on the projected image in line with the aiming element; means including a spring actuated bolt for actuating the film marking means to mark the film; a reciprocable member operable by the trigger for tensioning the spring; a latch connecting the bolt and member; and means for tripping the latch to release the bolt when it has been moved a predetermined distance by the trigger.

4. In apparatus of the class described, the combination of an aiming element; a film provided with an image for projection on to a screen; means, positioned relative to the film by the aiming element, for marking the film at a point thereon corresponding to a point on the projected image in line with the aiming element; means including a spring actuated bolt for actuating the film marking means to mark the film; means including a latch for moving the bolt to tension the spring; means for tripping the latch to release the bolt; and means for throwing the latch out of its operative position when the bolt has been operated a predetermined number of times.

5. In apparatus of the class described, the combination of an aiming element; a film provided with an image for projection on to a screen; means, positioned relative to the film by the aiming element, for marking the film at a point thereon corresponding to a point on the projected image in line with the aiming element; means including a spring actuated bolt for actuating the film marking means to mark the film; means including a latch for moving the bolt to tension the spring; means for tripping the latch to release the bolt; means for throwing the latch out of its operative position when the bolt has been operated a predetermined number of times; and manually operable means for resetting the latch to its initial position.

6. In apparatus of the class described, the combination of an aiming element; a film provided with an image for projection on to a screen; a clamp adapted to position the film for projection; means for marking the film at a point thereon corresponding to a point in the projected image in line with the aiming element; means for feeding films one by one to the clamp; a manually operable plunger; means operable by the plunger, during a limited movement, for opening the clamp to release the film; and means operable by the plunger, during a more extended movement thereof, for actuating the feeding means to feed a fresh film to the clamp.

7. In apparatus of the class described, the combination of an aiming element; a film provided with an image for projection on to a screen; means, positioned relative to the film by the aiming element, for marking the film at a point thereon corresponding to a point on the projected image in line with the aiming element; means including a slide for actuating the film marking means to mark the film; a spring actuated bolt; means including a latch for moving the bolt to tension the spring; means for tripping the latch to release the bolt; a pawl pivotally connected with the bolt and adapted to move the slide therewith when the latch is tripped; and means for moving the pawl out of engagement with the slide when the bolt is returned to its initial position.

8. In apparatus of the class described, the combination of an aiming element; a film provided with an image for projection on to a screen; means, positioned relative to the film by the aiming element, for marking the film at a point thereon corresponding to a point on the projected image in line with the aiming element; linkage for actuating the film marking means to mark the film and including a pivoted arm; a slide; a connecting rod for connecting the pivoted arm and the slide; a bolt; a pawl pivotally connected with the bolt and adapted to engage the slide; a spring connected with the pivoted arm and the pawl; means including a latch for moving the bolt to increase the tension of the spring; means for tripping the latch to release the bolt; and means for moving the pawl to disengage it from the slide when the bolt is returned to its initial position whereby the spring will return the pivoted arm and thus the marking means to their initial positions.

9. In apparatus of the class described, the combination of an aiming element; a film provided with an image for projection on to a screen; means, positioned relative to the film by the aiming element, for marking the film at a point thereon corresponding to a point on the projected image in line with the aiming element; means including a spring actuated bolt for actuating the film marking means to mark the film; means including a latch for moving the bolt to tension the spring; means for tripping the latch to release the bolt; a rack provided with ratchet teeth and adapted to engage the latch to move it to an inoperative position; means including a pawl operable by the film marking actuating means for picking the teeth on the rack to move it into engagement with the latch; a movable plate for carrying the picking means; and means for moving the plate to release the picking means from the ratchet teeth.

10. In apparatus of the class described, the combination of an aiming element; a film provided with an image for projection on to a screen; means for positioning the film for projection; means for marking the film at a point thereon corresponding to a point on the projected image in line with the aiming element; means including a spring actuated bolt for actuating the film marking means to mark the film; means including a latch for moving the bolt to tension the spring; means for tripping the latch to release the bolt; means for moving the latch to an inoperative position when the bolt has been operated a predetermined number of times; means for feeding films one by one to the positioning means; and manually operable means for actuating the feeding means to feed a fresh film to the positioning means and for resetting the latch to its initial position.

11. In apparatus of the class described, the combination of an aiming element; a film provided with an image; a device for projecting the image on the film on to a screen and including an electric lamp; a switch for controlling energy to the said lamp, a clamp adapted to position the film for projection; means for marking the film at a point thereon corresponding to a point on the projected image in line with the aiming element; and manually operable means for opening the clamp and the switch simultaneously.

12. In apparatus of the class described, the combination of an aiming element; a film provided with an image; a device for projecting the image on the film on to a screen and including an electric lamp; a switch for controlling energy to the said lamp; means for marking the film at a point thereon corresponding to a point on the projected image in line with the aiming element; a manually operable plunger; and means operable by the plunger, during a limited movement thereof, to open the switch and during a more extended movement thereof to close the switch.

13. In apparatus of the class described, the combination of an aiming element; a film provided with an image for projection on to a screen; means for positioning the film for projection; means for marking the film at a point thereon corresponding to a point on the projected image in line with the aiming element; means including a spring actuated bolt for actuating the film marking means to mark the film; means including a latch for moving the bolt to tension the spring; means for tripping the latch to release the bolt; means for moving the latch to an inoperative position when the bolt has been operated a predetermined number of times; means for feeding films one by one to the positioning means; a device for projecting the image on the film on to the screen and including an electric lamp; a switch for controlling energy to the said lamp; a manually operable plunger; means operable by the plunger, during a limited movement thereof to open the switch and during a more extended movement to close the switch; and means operable by the plunger during its said extended movement for actuating the feeding means to feed a fresh film to the positioning means and for resetting the latch to its initial position.

14. In apparatus of the class described, the combination of an aiming element; a film provided with an image for projection on to a screen; means, positioned relative to the film by the aiming element, for marking the film at a point thereon corresponding to a point on the projected image in line with the aiming element, the film marking means being normally positioned out of the path of the film projection; linkage connected with the film marking means; a bolt; spring means for moving the bolt in one direction and tending to move the film marking means to its normal position; a disengageable drive connection between the bolt and the linkage for causing the film marking means to mark the film; and means for disengaging the said drive connection when the bolt nears the end of its movement by the spring.

15. In apparatus of the class described, the combination of an aiming element; a film provided with an image for projection on to a screen; means, positioned relatively to the film by the aiming element, for marking the film at a point thereon corresponding to a point on the projected image in line with the aiming element, the film marking means being normally positioned out of the path of the film projection; linkage connected with the film marking means; a bolt; a pawl carried by the bolt and adapted to engage the linkage to cause the film marking means to mark the film; a spring connected with the pawl and the linkage to tend to move the bolt in one direction and to tend to move the film marking means to its normal position, the spring also tending to snap the pawl into driving engagement with the linkage; and means for disengaging the pawl from the linkage when the bolt nears the end of its movement by the spring.

Signed at Toronto this 20th day of June, 1929.

JOHN W. MILLER.